INVENTOR.
ALAN G. BUTT

United States Patent Office 3,372,453
Patented Mar. 12, 1968

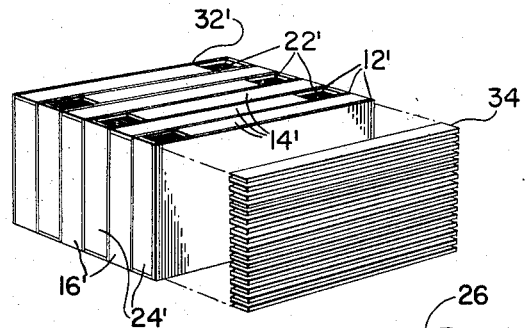
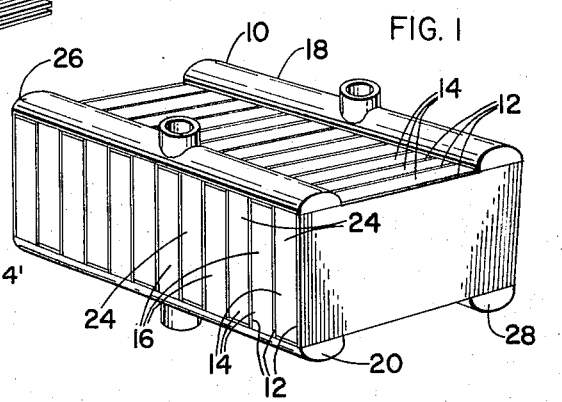
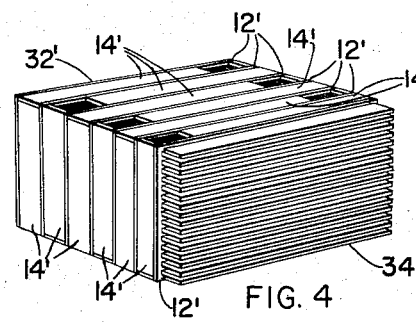
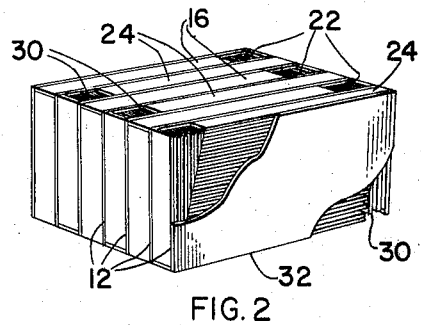
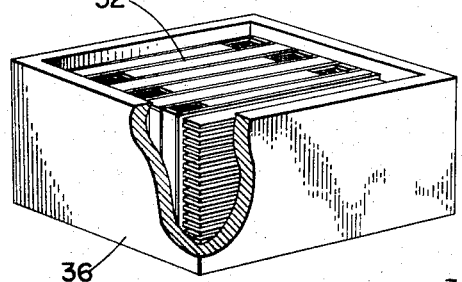
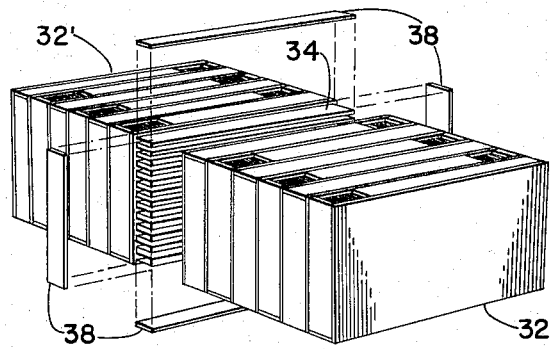

3,372,453
PLATE TYPE HEAT EXCHANGER AND METHOD
OF CONSTRUCTION AND REPAIR
Alan G. Butt, La Crosse, Wis., assignor to The Trane
Company, La Crosse, Wis., a corporation of Wisconsin
Filed Mar. 22, 1965, Ser. No. 441,466
12 Claims. (Cl. 29—157.3)

ABSTRACT OF THE DISCLOSURE

A method of assembling two plate type heat exchanger core sections for heat transfer therebetween wherein the core sections had been formed by furnace or bath brazing and the side plate surfaces between which heat is to be transferred are irregular or nonplanar due to warpage when the core sections were brazed. The method includes the placement of a corrugated metallic heat conductive sheet between the side plates of the two core sections to conduct heat from one side plate to the other side plate. The corrugated sheet is of sufficiently thin material that when pressed between the irregular plate surfaces, the convolutions thereof yield and conform to the surface irregularities thereby forming an efficient heat conductive link between the side plates. Because an efficient thermal connection is thus made, it is unnecessary to braze the corrugated metallic heat conductive sheet to both core sections which would require the reheating of the core sections to braze fusion temperatures with the attendant risk that previously brazed bonds within the core sections would be broken.

---

This invention relates generally to plate type heat exchangers of the kind brazed in the aggregate. It further relates to the method of constructing and repairing the same.

The term "plate type heat exchanger" is intended to designate a heat exchanger comprising a plurality of plate members stacked in spaced generally parallel relationship and sealingly brazed together at their peripheries. The term "brazed in the aggregate" is intended to designate brazing of an assemblage of plate and connecting elements in a furnace or bath as distinguished from local brazing by torch or electric arc. The space formed between the generally parallel plates thus define heat exchanger passages which may be provided with extended heat transfer surface or packing if desired.

Particularly the invention involves the assemblage of two core sections into a single heat exchanger wherein the thermal resistance of the interface is reduced by the use of a yieldable metallic layer interposed therebetween.

The instant invention finds particular utility should it be necessary to construct an aggregately brazed plate type heat exchanger of larger size than furnace or bath brazing facilities permit. It is further useful in the repair of heat exchangers which have been formed by bath or furnace brazing and consequently cannot without great difficulties be brazed a second time in this manner.

Thus a prime object of the invention is to provide a method of constructing a plate type heat exchanger of the kind brazed in the aggregate which is larger than would otherwise be permitted by brazing facilities.

A second object is to provide a method of repairing a plate type heat exchanger which has been formed by bath or furnace brazing.

A third object of the instant invention is the provision of a plate type heat exchanger comprised of a plurality of plate type heat exchanger cores each brazed in the aggregate and connected in face-to-face heat exchange relationship at their plate sides.

Other objects and advantages of this invention will become apparent as this description proceeds to describe the invention with reference to the accompanying drawings wherein:

FIGURE 1 is a perspective view of a damaged plate type heat exchanger which had been brazed in the aggregate;

FIGURE 2 shows the salvable portion of the heat exchanger of FIGURE 1;

FIGURE 3 is an assemblage of elements for a new section of a plate type heat exchanger core and a novel yieldable heat transfer member;

FIGURE 4 shows the core elements and heat transfer member of FIGURE 3 brought together in contiguous relation ready for brazing in a bath;

FIGURE 5 shows the core and the heat transfer member of FIGURE 4 being brazed in the aggregate by immersion in a heating bath which has a portion of the side broken away;

FIGURE 6 shows the brazed core section from FIGURE 5 being arranged in juxtaposed relationship to the repairable or salvable heat exchanger core portion of FIGURE 2 with the novel yieldable heat transfer member therebetween and a plurality of closing bars readied for assembly;

Figure 7:
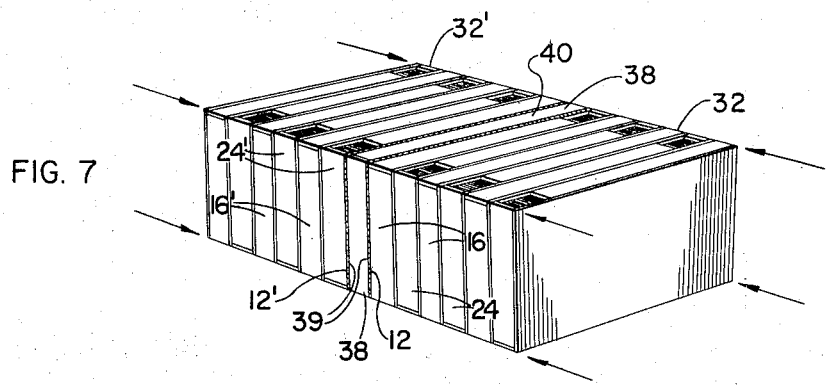
FIGURE 7 illustrates the elements of FIGURE 6 connected as by local welding or brazing thereby forming a sealed heat transfer chamber between the new core section and salvable core portion.

In FIGURE 1 is illustrated a plate type heat exchanger 10 having a damaged rear portion. Heat exchanger 10 is comprised of a plurality of metallic plates 12 stacked in spaced generally parallel relationship. A plurality of closing bars 14 extend at the periphery between adjacent pairs of plates 12 thereby defining a plurality of flat chambers or passages. The sides of the heat exchanger closed by bars 14 will be termed "bar face sides." Sides generally parallel to plates 12 will be termed the "plate sides." Passages 16 are arranged in fluid communication with inlet header 18 and outlet header 20 via ports 22 (FIGURE 2). Similar passages 24 disposed alternately and in heat exchange relation with passages 16 are arranged in fluid communication with inlet header 26 and outlet header 28 via ports 30 (FIGURE 2). The plates and closing bars are sealingly bonded in place by furnace or bath brazing. Heat transfer between the fluid passages 16 and 24 is through plates 12.

For purposes of illustrating the invention, it has been assumed that the rear portion of heat exchanger 10 has been damaged and that it is desirable to salvage the undamaged portion. Heretofore it has not been found feasible to replace the damaged portion because of difficulties encountered in attempting to braze the core assembly as the undamaged portion had been previously brazed in the aggregate. There is no known way to successfully introduce flux and brazing alloy into such a previously brazed core portion. Reheating this core portion without added brazing materials tends to precipitate leaks and failures.

In accordance with this invention, the damaged portion of the core is separated and removed from the repairable portion 32 which is illustrated in FIGURE 2. The entire header means may be removed as illustrated in FIGURE 2, or only those portions need be removed that are necessary to remove the damaged portions of the core. The repairable portion 32 shown in FIGURE 2 is thus readied for connection to a replacement core section 32' in accordance with the concepts of the instant invention.

The replacement core section 32' is shown being assembled in FIGURE 3. Its construction is similar to that of the damaged portion and parts which are similar to those of the core of heat exchanger 10 have been designated by a prime after a corresponding reference numeral.

FIGURE 3 also shows a yieldable metallic heat transfer member 34. This member may be formed by corrugating a metallic sheet. This metallic sheet is sufficiently thin to permit the convolutions or legs thereof to yield under pressure as hereafter described. Member 34 may be placed against a side plate 12' of core section 32' as shown in FIGURE 4. The individual members 12' and 14' of section 32' and yieldable member 34 may be brazed together in the aggregate in a brazing bath vessel 36 as illustrated by FIGURE 5.

In accordance with the invention, core sections 32 and 32' are each arranged with a side plate in face-to-face relation with the yieldable heat transfer member 34 therebetween as illustrated in FIGURE 6. FIGURE 6 also shows a plurality of closing bars 38 which will hereafter be explained. The two previously brazed core sections 32 and 32' with the heat transfer member 34 between are forced together as indicated by the arrows in FIGURE 7 thereby causing the yieldable heat transfer member to come into good thermal contact with side plates of both core sections. The heat transfer member 34 yields sufficiently under such pressure to conform to the surface irregularities in the adjacent plate members 12 and 12'. It will be understood that the faces of plates 12 and 12' are quite irregular from the prior brazing. While the core sections are forced together, closing bars 38 are locally brazed or welded into place as by torch or electric arc at 39 as shown in FIGURE 7.

Figure 8:
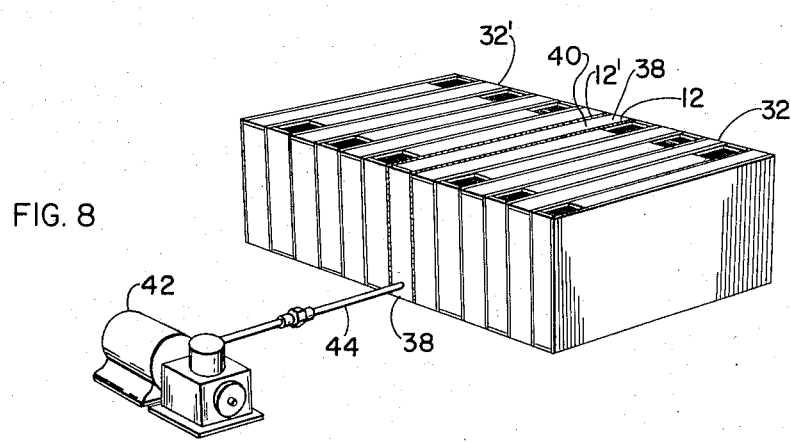
FIGURE 8 illustrates a step of evacuating the atmosphere from the sealed chamber.
Figure 9:
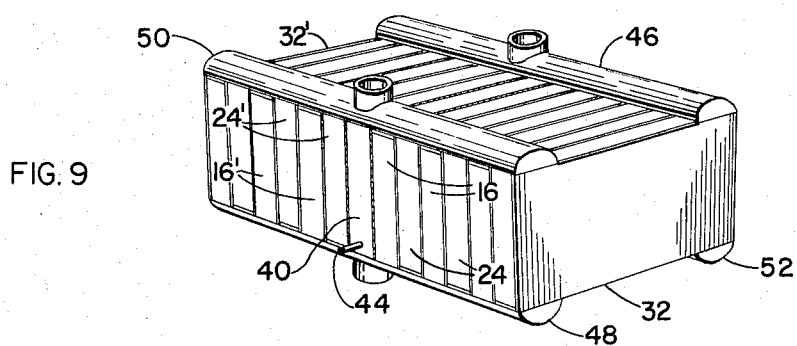
FIGURE 9 illustrates the repaired heat exchanger core after having been provided with headers for distribution and collection of heat exchange fluid to and from the various heat exchange passages of the repaired brazed plate type core.

The yieldable heat transfer member 34 is thus enclosed in a hermetically sealed chamber 40 defined by the adjacent side plates 12 and 12' and the closing bars 38. Bars 38 retain plates 12 and 12' in contact with transfer member 34. The atmosphere within this hermetic chamber is then evacuated by a vacuum pump 42 through an appropriated tubulation 44 as illustrated in FIGURE 8. The tubulation may be subsequently sealingly pinched off as is well known to the art of evacuating chambers.

The heat exchanger is completed by the addition of inlet and outlet headers 46 and 48 respectively, for passages 16 and 16' and inlet and outlet headers 50 and 52 respectively for passages 24 and 24'. Each of headers 46, 48, 50 and 52 spans chamber 40 on a bar face side and is connected to a closing bar 38 thereof.

During use of the heat exchanger employing this invention, heat is conducted between the fluid passages adjacent chamber 40 via yieldable heat transfer member 34 which owing to its yieldable and deformable character is in good thermal contact with each of the side plates adjacent thereto in spite of surface irregularities thereof. The fluid pressures within the heat exchange passages further improves this thermal contact.

While this invention has been heretofore described as a method of repairing a brazed plate type heat exchanger, it is equally applicable to the construction of all new heat exchangers, particularly when the physical dimensions exceed that of existing furnace or bath brazing facilities. This method differs only from the above described in that two new previously brazed plate type heat exchanger core sections are used. Once again the yieldable heat transfer member may be furnace or bath brazed to one of the sections.

It is also possible by use of the instant invention to connect the salvable portions of two or more damaged brazed plate type heat exchanger cores. This method differs from the repair method described above insofar as the yieldable heat transfer member 34 cannot be furnace or bath brazed to either of the previously brazed salvaged sections. However, mechanical contact of the yieldable heat transfer member will often suffice.

Although I have described in detail the preferred form of my invention, I contemplate that many changes may be made without departing from the scope or spirit of my invention and I desire to be limited only by the claims.

I claim:

1. A method of constructing a plate type heat exchanger including the steps of providing two plate type heat exchanger core sections which had been previously formed by brazing in the aggregate and each having a side plate of generally matching configuration, one of which plates has a nonplanar surface as a result of said brazing; arranging said core sections with said matching side plates in spaced substantially parallel relation with a heat transfer member therebetween having a plurality of laterally extending heat conductive yieldable metallic legs; bringing the end portions of said legs into contact with the nonplanar portions of said one plate; and connecting the matching side plates adjacent the peripheries thereof thereby defining therebetween an enclosure circumscribing said heat transfer member.

2. The method defined by claim 1 further including the steps of withdrawing a portion of the fluid remaining in said enclosure thereby drawing said matching side plates toward each other in improved heat transfer relation with said heat transfer member and sealing said enclosure.

3. The method defined by claim 1 further including the step of forcing said maching side plates toward each other during said connecting step.

4. The method defined by claim 3 further including the steps of withdrawing a portion of the fluid remaining in said enclosure thereby drawing said matching side plates toward each other in improved heat transfer relation with said heat transfer member and sealing said enclosure.

5. A method of repairing a damaged plate type brazed heat exchanger core including the steps of removing from the repairable portion of said core the fluid passage layer which has been damaged; providing a replacement core section for said damaged portion; arranging a side of said repairable portion of said core in juxtaposed relation to a side of said replacement core section with a yieldable metallic heat transfer member therebetween; and connecting said repairable portion and said replacement section adjacent the periphery of the juxtaposed sides thereby forming an enclosure therebetween containing said yieldable metallic heat transfer member.

6. The method defined by claim 5 further including the steps of withdrawing a portion of the fluid remaining in said enclosure thereby drawing said repairable portion and said replacement section in improved heat transfer relation with said yieldable heat transfer member and sealing said enclosure.

7. The method defined by claim 1 including the steps of providing a corrugated metallic sheet heat transfer member; positioning a face of said corrugated metallic sheet heat transfer member in abutting relation to said one plate with the crests on said one face in contiguous relation with said nonplanar surface.

8. The method defined by claim 7 further including the steps of withdrawing a portion by the fluid remaining in said enclosure thereby drawing said matching side plates toward each other in improved heat transfer relation with said corrugated metallic sheet heat transfer member and sealing said enclosure.

9. The method defined by claim 7 including the step of maintaining the braze bonds formed when said core sections were previously brazed in the aggregate below their fusion temperature during said step of connecting said side plates together at the peripheries thereof.

10. The method defined by claim 9 further including the steps of withdrawing a portion of the fluid remaining in said enclosure thereby drawing said matching side plates toward each other in improved heat transfer relation with said corrugated metallic sheet heat transfer member and sealing said enclosure.

11. The method defined by claim 1 including the steps of providing a corrugated metallic sheet heat transfer member; positioning one face of said corrugated metallic sheet heat transfer member in abutting relation to said one plate with the crests on said one face in contiguous relation with said nonplanar surface and positioning the other face of said corrugated metallic sheet heat transfer member in abutting relation to the other of said side plates with the crests on said other face of said corrugated metallic sheet heat transfer member in contiguous relation with said other of said side plates.

12. The method defined by claim 11 further including the steps of withdrawing a portion of the fluid remaining in said enclosure thereby drawing said matching side plates toward each other in improved heat transfer relation with said corrugated metallic sheet heat transfer member and sealing said enclosure.

References Cited
UNITED STATES PATENTS

| | | | |
|---|---|---|---|
| 2,686,957 | 8/1954 | Koerper | 29—157.3 |
| 3,148,442 | 9/1964 | Gier | 29—157.3 |
| 2,828,947 | 4/1958 | Hedbom | 165—166 |
| 2,869,835 | 1/1959 | Butt | 165—166 |
| 3,139,679 | 7/1964 | Saj | 29—471.1 |

JOHN F. CAMPBELL, *Primary Examiner.*

ROBERT A. O'LEARY, *Examiner.*

T. W. STREULE, PAUL M. COHEN,
*Assistant Examiners.*